United States Patent
Mannheim Astete et al.

(10) Patent No.: US 9,365,161 B2
(45) Date of Patent: Jun. 14, 2016

(54) PANORAMIC EXTENDED WINDSHIELD WITH INTEGRATED NON-MOVING BLIND

(71) Applicant: AGP America S.A., Panamá (PA)

(72) Inventors: Mario Arturo Mannheim Astete, Cercado de Lima (PE); Andrés Fernando Sarmiento Santos, Sao Jose Dos Pinhais (BR); Camilo Ignacio Cuervo Figueredo, Sao Jose Dos Pinhais (BR); Manuel Leonardo Serrano Rey, Bogotá D.C. (CO); Juliana Schottborgh Rodríguez, Bogotá D.C. (CO); Jimmy Alexander Quijano Reyes, Cercado de Lima (PE); Charles S. Voetzel, New Kensington, PA (US)

(73) Assignee: Mario Arturo Mannheim Astete, Lima (PE)

( * ) Notice: Subject to any disclaimer, the term of this patent is extended or adjusted under 35 U.S.C. 154(b) by 0 days.

(21) Appl. No.: 14/309,392

(22) Filed: Jun. 19, 2014

(65) Prior Publication Data
US 2015/0367782 A1    Dec. 24, 2015

(51) Int. Cl.
*B60J 1/00* (2006.01)
*B60R 1/00* (2006.01)
(Continued)

(52) U.S. Cl.
CPC .................. *B60R 1/001* (2013.01); *B32B 17/00* (2013.01); *B60J 3/04* (2013.01); *G02F 1/0126* (2013.01); *G02F 1/1333* (2013.01); *G02F 1/167* (2013.01)

(58) Field of Classification Search
CPC ................... B32B 17/10036; B32B 17/10761; B32B 17/10; B32B 17/10174; B32B 2367/00; B62D 25/06; H01Q 1/1271; B60J 7/0015; B60J 10/02
USPC ................ 296/84.1, 146.15, 146.5, 201, 210, 296/193.06, 214, 215, 97.8; 156/108; 52/208; 359/275
See application file for complete search history.

(56) References Cited

U.S. PATENT DOCUMENTS 5,706,107 A * 1/1998 Smith ...................... G02B 5/32
                                              296/96.12
5,803,534 A * 9/1998 Murkett .................... B60J 7/04
                                              296/215

(Continued)

FOREIGN PATENT DOCUMENTS

DE       102004010790      10/2005
EP          1710104        11/2009
(Continued)

OTHER PUBLICATIONS

SAE International. "Passenger Car Windshield Wiper Systems." Standard J903. Published May 1, 1999. http://standards.sae.org/j903a_196605/.

*Primary Examiner* — Kiran B Patel
(74) *Attorney, Agent, or Firm* — The Morales Law Firm; Joseph L. Morales

(57) ABSTRACT

A vehicle windshield with a top edge extended such as to provide a lower drag coefficient and giving the driver a wider panoramic vertical viewing angle and having an integrated shading means, having no movable parts and utilizing a material which is capable changing its light transmittance electrically and with a controlling means which mimics the aesthetics of a conventional mechanical blind. Aspects of the various embodiments include: switchable segmented sun visors, integrated solid state lighting, a mounting means for attachment of a center console, mirrors, cameras and other devices, a controlling means capable of providing a variety of opening and closing sequences, a user programmable interface, a touch screen interface, touch sensitive activation, a sound emitting means to provide for the audible aesthetic of the blind, inclusion of substantially the entire roof, inclusion of substantially the entire roof and the rear window, and any combination of a tinted, heat reflecting, heat absorbing or photo-chromic coating, film or interlayer in all or a portion of the glazing area.

28 Claims, 19 Drawing Sheets

(51) Int. Cl.
*G02F 1/1333* (2006.01)
*G02F 1/167* (2006.01)
*G02F 1/01* (2006.01)
*B60J 3/04* (2006.01)
*B32B 17/00* (2006.01)

(56) References Cited

U.S. PATENT DOCUMENTS

| | | | | |
|---|---|---|---|---|
| 5,910,854 | A * | 6/1999 | Varaprasad | B32B 17/06 |
| | | | | 359/273 |
| 6,086,133 | A * | 7/2000 | Alonso | B60J 1/2019 |
| | | | | 160/23.1 |
| 6,118,410 | A * | 9/2000 | Nagy | 343/713 |
| 7,333,258 | B2 * | 2/2008 | Yang et al. | 359/265 |
| 7,814,958 | B2 | 10/2010 | Hansen et al. | 160/370.22 |
| 8,102,586 | B2 * | 1/2012 | Albahri | 359/265 |
| 8,610,992 | B2 * | 12/2013 | Varaprasad | 359/265 |
| 8,613,997 | B2 * | 12/2013 | Day | 428/209 |
| 8,678,488 | B1 * | 3/2014 | Kim | 296/214 |
| 2007/0182217 | A1 * | 8/2007 | Saleen et al. | 296/215 |
| 2009/0115922 | A1 * | 5/2009 | Veerasamy | B32B 17/10 |
| | | | | 349/16 |
| 2009/0135319 | A1 * | 5/2009 | Veerasamy | G02F 1/1334 |
| | | | | 349/16 |
| 2011/0273659 | A1 * | 11/2011 | Sobecki | B60R 1/088 |
| | | | | 349/195 |
| 2012/0307337 | A1 * | 12/2012 | Bartug et al. | 359/245 |
| 2013/0038093 | A1 * | 2/2013 | Snider | 296/219 |
| 2015/0286073 | A1 * | 10/2015 | Blum | G02C 7/102 |
| | | | | 351/159.66 |

FOREIGN PATENT DOCUMENTS

| | | |
|---|---|---|
| WO | 9918320 | 4/1999 |
| WO | 2013079832 | 6/2013 |
| WO | 2014055386 | 4/2014 |

* cited by examiner

PANORAMIC EXTENDED WINDSHIELD WITH INTEGRATED NON-MOVING BLIND

FIELD OF THE INVENTION

The presently disclosed invention is directed to the use of electrically controlled variable light transmittance films, such as PDLC and SPD in a panoramic automotive glazing.

BACKGROUND OF THE INVENTION

Regulatory standards and specifications for products and processes are often written based upon an existing technology. This is understandable as it is a practical and pragmatic approach. Often, the ideal technology may not be economical or achievable. The primary problem over time with these technology based standards is that they are infrequently revised as the technology changes unless there is some compelling reason to do so.

The forward driver vision requirements for vehicles are dictated by government regulations. The intent is to ensure that the driver has an adequate field of view to safely operate the vehicle. The ideal, based just upon human factors, would be to have an unobstructed view in all directions. This is not possible or practical. Given the structural requirements of the vehicle, the ideal must be compromised.

The process for determining the top of the driver vision zone is illustrated in FIG. 1. Regulations determine the minimum dimensions of the transparent portion 12 of the windshield. In the United States, the forward driver vision zones for passenger vehicles windshields are defined by SAE J903, Passenger Car Windshield Wiper Systems, which was first issued in 1964. J903 is reviewed every five years but has remained largely unchanged since its inception. The last update was in 1999.

At the time that J903 was first issued, windshields were typically mounted at a nearly vertical installation angle 108 and had little or no vertical curvature. Interestingly, several models produced from the mid-50s through the mid-60s were outfitted with what was then called a panoramic windshield. This windshield extended the vertical edges to wrap around and into the area typically occupied by the A-pillar. Due to the small radius of the wrap, the optical quality in this area was poor.

The windshield driver vision zones, per J903, are calculated with the windshield at installation angle 108. The installation angle 108 is the angle relative to horizontal 102 of a cord 104 connecting the top and bottom points of the vertical centerline 106. SAEJ903 calls for the use of a statistical analysis of a driver population to generate an elliptical shape that is defined by J903 as an "eyelipsise". The eyelipsise bounds an area which will include the eye points for most of the population. The eye point 100 of a statistically tall driver is used to determine the top edge of the vision zone. Having defined the "eyelipsise" for the vehicle, J903 calls for creating a horizontal plane, passing through the tall driver eye point, and then rotating the plane about the driver eye point upward by 10 degrees. The intersection of the rotated plane and the windshield form the top of the driver vision zone. This imaginary line 14 is known as the AS1 line and is the boundary of the AS1 area. Government safety regulations require that this location be permanently marked on every windshield. The area below the AS1 mark must have light transmittance of at least 70% for vehicles sold in the United Sates, and must not be otherwise obscured by the rear view mirror, the black band 10, or any other objects. Vision zones for vehicles manufactured in the European Union must comply with ECE R43 which is similar to the US regulation with the one major exception which requires that the light transmittance below the AS1 line must be at least 75%.

The method for calculating the bottom of the zone is similar to the method used for the top but based upon the eye point of a statistically short driver and at a smaller rotation angle. The end result is a total minimum driver vision zone angle of less than 20 degrees. While this is adequate for most driving conditions, it can make it difficult to see high mounted signals and signs under some circumstances, such as when facing downhill, with such a limited view. In some parts of the world driver eye-level traffic signals are used in addition to the overhead signals for this reason.

The windshield shown in FIG. 1 has an installation angle of 23 degrees. It can be seen that the sheet metal 16 of the roof is tangent to the windshield at the top edge 15 of the windshield where the two meet. If the top edge 15 of the windshield were to be extended by just 10-15 cm, the driver vision could be increased from 10 degrees relative to horizontal to 45 degrees or better. A perspective view of the windshield and sheet metal 16 is shown in FIG. 2.

At one time, low windshield installation angles, as shown in FIG. 1, were reserved for bullet trains, high speed exotics and race cars. In response to rising fuel prices and government efficiency requirements, automotive manufacturers have been paying close attention to the aerodynamic drag factors of their vehicles. Vehicle losses due to aerodynamic drag increase exponentially relative to the speed of the vehicle and become substantial at higher speeds. The formula for calculating aerodynamic drag is:

$$F_D = \tfrac{1}{2} \rho v^2 C_D A$$

Where
$F_D$ is the force of drag;
$\rho$ is the mass density of air;
$v$ is the velocity of the vehicle;
$A$ is the frontal area of the vehicle; and
$C_D$ Is the drag coefficient, a number between 0 and 1 which takes into account the shape of the vehicles.

As the speed doubles, the losses quadruple. At 40 kph, the losses are 4 times what they are at 20 kph and at 80 kph they become 16 times what they are at 20 kph.

A vehicle with a flat box like front end might have a drag coefficient close to 1 while a high speed train or exotic car might be less than 0.3. The lower the value the more fuel efficient that vehicle will be. Thus, a windshield with a lower installation angle will be more efficient that one with a higher angle, with all else the same.

Designers have also been working to reduce or eliminate other sources of drag. The discontinuity between the edge of the glass and the sheet metal is a source of drag and also a source of cabin noise. This has driven the trend towards flush glazing and the elimination of decorative trim and moldings. The top edge 15 of a conventional windshield is one of the areas where turbulent energy consuming air flow occurs at the interface between the windshield and the sheet metal. Moving the interface into the roof-line would improve drag but this has not been commonly done.

The lower installation angle also allows for the sheet metal of the roof to be designed such that it is tangent to the windshield and has a large radii transition from the windshield to the largely horizontal roof. This makes it possible to produce a windshield that has a panoramic viewing angle in the vertical direction which will have good optics in the transition area and be possible and economical to fabricate using conventional glass bending processes.

In U.S. Pat. No. 6,118,410A, Nagy et. al extends the top edge 15 of the windshield in order to provide an electromagnetically transparent cover for an "antenna shelf" to be used for GPS, GSM, satellite and other signals rather than for vision or aerodynamics. The extended portion is not for driver vision and is covered by the black band 10.

The Opel Astra GTC vehicle, first produced in the 2005 model year, is one of the few examples of a series production vehicle with a panoramic windshield. The top edge 15 extended well into the roof line and above the drive and front seat passenger. As the windshield and the roof needed to be fabricated from the same glass that would meet the EU 75% light transmittance specification, a dark tint could not be used. The roof portion was equipped with a mechanic blind that added cost and weight and limited the glass functionality as it either blocked 100% the visible light or none, all shortcomings of

THE PRIOR ART

The market indicates that there is a desire for improved vision and an increased level of natural light in the passenger compartment that a panoramic windshield would provide. Styling trends for many years now have favored larger glazed areas on vehicles which has the added benefit in that it also reduces weight. A very popular vehicle option, in many of the world's automotive markets, is the transparent roof panel commonly referred to as a sunroof, moon roof or panoramic roof. Such transparent roof panels provide increased natural light, visibility, and a more open and spacious feel to the vehicle cabin.

While the purpose of the transparent roof panel is to allow light to enter the vehicle, it is possible that under some circumstances it may be desirable to limit the amount of light entering the vehicle. On a bright sunny day, the intensity of the light can become uncomfortable to the skin and eyes. The solar radiation entering through the roof panel also can rapidly heat the interior of the vehicle increasing the load on the air-conditioning system and increasing the interior temperature of a parked vehicle by several degrees. As a result dark tinted glass, with an approximate light transmittance of 20%, is typically used.

However, in cold environments, the increased cabin solar radiation can help to keep the interior of the vehicle warm. This is especially important for vehicles equipped with high efficiency internal combustion engines where there is very little waste heat available from the engine and even more so with electric and hybrid electric vehicle where the power to heat the vehicle must be provided by the battery which reduces the range of the vehicle and the life of the battery. Therefore, a clear high transmittance glass would be desirable for these roof panels.

An example of the prior art is shown in FIG. 3. The roof area above the driver has been replaced with a transparent panel 18. Tempered dark tint glass, that transmits just 20% of the available solar energy, is typically used. Glass with a higher light transmission is not used as the vehicle will rapidly heat on a bright day. This approach limits the maximum light intensity but also limits the energy entering the cabin when it may be desirable to have more light and solar energy enter the cabin.

Some type of shading means is typically provided to limit the light in addition to the tinted glass. A sliding opaque panel is normally provided to control the amount of light entering from the sunroof 18 of FIG. 3. With a 20% tint sunroof, the light entering can be regulated from 20% down to zero. Clearly, a wider range would be beneficial.

The maximum area of such roof panels has been limited due to the need to provide space for the shading means. As can be appreciated from FIG. 3, to accommodate a sliding panel shade, the sunroof must be limited to less than half of the roof area. The area illuminated by the roof panel of the prior art as illustrated in FIG. 3 is limited to the front portion of the vehicle cabin.

Another disadvantage of the sliding shade approach is that to accommodate said mechanical shading means the head room of the vehicle must be reduced, often in excess of 2 cm, or the roof height increased neither of which are desirable. The shading means of the prior art also results in: additional assembly labor, and increased number of parts, increased complexity, potential for warranty claims, and increased vehicle weight.

An improvement on the sunroof is the panoramic roof of the prior art. FIG. 4 shows that substantially the entire horizontal portion of the roof has been replaced by the panoramic roof 20. The only remaining sheet metal 16 of the roof is in the transition area between the panoramic roof and the windshield. Most panoramic roof systems comprise two or more transparent glass panels. The panels also are typically made with a dark tint glass and so share the same disadvantages of the smaller sunroof of the prior art.

A sliding flat panel cannot be used as a shade on a panoramic sun roof. A number of roller blind type shading means have been developed. U.S. Pat. No. 8,678,488 B1, Kim, and U.S. Pat. No. 7,814,958 B2, Hanson, both disclose roll-up blind systems for use with panoramic transparent roofs. While they allow for much larger roof glass areas, they are expensive. They also use dark tinted glass and so share the deficiencies of the prior art as well as reducing headroom even further, adding several additional parts, and increasing the probability of failure and warranty issues.

A transparent roof system for an automobile is disclosed by US 20070182217 A1. A transparent panel extends from the top front edge of the front windshield to the top edge of the rear window. The two gaps between the windshield, roof and rear window are minimized to provide for improved aesthesis, aerodynamic drag and lowered wind noise. This has the same advantages and disadvantage of the prior art previously described as dark tinted glass is used and a shading means must be provided.

As mentioned, one of the fundamental problems of the prior art is the dependence on the use of a dark tint to limit the maximum light transmittance. It would be beneficial, in cold climates, to allow as much energy as possible to enter the cabin through the roof. There are a number of technologies that can be used to produce variable light transmittance (tint) glazing which can switch from high transmittance to low transmittance. The primary technologies in commercial use are: Electrochromic, Suspended Particle Devices (SPD), and Polymer Dispersed Liquid Crystal (PDLC). An excellent description of the three technologies can be found in U.S. Pat. No. 7,333,258 B2, Electrochromic Material, so a detailed in depth discussion will not be presented here.

Electrochromic switchable materials are chemical compounds that change from a transparent state to a less transparent state when a low voltage direct current is passed through the compound. These materials undergo a reversible chemical reaction in response to electric current. Electrochromic devices have very low power requirements and will maintain their last state in the absence of power for an extended period. Reversing the polarity of the current will return the compound to its previous state. Switching time is on the order of several seconds, from light to dark and back. Large Electrochromic windows can be found on one of the newer jumbo jets. The primary automotive application to date has been for the near ubiquitous self-dimming rear view mirrors. Only a small number of high end exotic vehicles have been built with Electrochromic sunroofs even though the technology has been commercially available for well over 10 years.

SPD makes use of high aspect ratio needle like particles (light valves) which when placed in an electric field will align with the field. When the field is switched off, the molecules take on a random light blocking orientation. The extent of alignment varies with the magnitude of the applied alternating current (AC) peak to peak voltage allowing the tint to be set to any point between the two states. SPD will not switch with DC current.

PDLC makes use of molecules that are sensitive to an electrical field. The main functional difference is that PDLC primarily scatters light going from clear to opaque. PDLC, like SPD, also operates on alternating current and is sensitive to the magnitude of the applied peak to peak voltage. PDLC will transition from clear to opaque and can be set to any point in-between. PDLC will not switch with DC current.

SPD and PDLC are very different chemically but the assembled film shares a common manufacturing process and actuating means. Both switch in response to an AC electric filed. Early implementations sandwiched the active SPD or PDLC material between sheets of transparent conductive coated glass. The conductive coating was used to apply the electrical field. A more economical approach replaces the two sheets of conductive coated glass with two sheets of a transparent conductive coated plastic substrate which are used to encapsulate the SPD or PDLC active material. The assembled film 130 is then laminated between two sheets of glass to provide for durability.

At least three high end passenger vehicles are known to be in series production, in the 2014 model year, that are equipped with switchable panoramic roofs systems. U.S. Pat. No. 8,102,586 B2, US 20130038093 A1, US 20070182217 A1 and US 20120307337 A1 each disclose some aspect of a switchable automotive glazing.

One of the problems that all of the switchable technologies have faced is that they are so new. Drapes, shutters, shades and blinds are among the means that have been used for centuries to limit the amount of light entering through a window and to provide privacy. Some time may be required for consumers to develop an appreciation for windows that can limit light and provide privacy without the aforementioned mechanical means. Chances are that consumers will continue to install drapes, shutters, blinds and shutter just for pure aesthetic reasons on their switchable windows. Note that non-functioning shutters are installed on millions of homes. WO1999018320 A1 describes a method for segmenting the switchable area into separate addressable elements. PDLC has the additional disadvantage that intermediate states have a hazy appearance which tends to give the viewer the perception that they are looking through "cheap" plastic.

Even with essentially the entire roof covered with glass, a supporting structure is still needed to mount the glazing and to support the rear view mirror, cabin lights, sun visors and other elements. These elements can weigh several kilograms. Thus, the actual drive field of vision is still interrupted at the transition from the windshield to the roof. DE102004010790A1 describes means for mounting a sun visor to the A pillars 201 (the left/right sets of pillars supporting the roof are designated as the A, B 202 and C 203 pillars. As showing on FIG. 19, the A pillars 201 support the front of the roof, the B pillars 202 provides support between the front and rear doors and the C pillars 203 support the rear of the roof). The problem of cabin lighting is addressed by EP 1710104B1 which proposes laminated conductors accessed through holes cut through the inner layer of glass. A more practical approach is taken by WO2013079832A1 which calls for laminating solid state lighting devices in the glazing. Similarly, U.S. Pat. No. 8,613, 997B2 discloses a glazing having LEDs, mounted to a circuit board, laminated between the plys of glass.

BRIEF SUMMARY OF THE INVENTION

The trend towards low windshield installation angles with the roof sheet metal continuing tangent to the top of the windshield and making a large radii transition makes it possible to economically mass produce large windshields, having good optics in the transition area, which incorporate a substantial portion if not the entire roof section and even the rear window. Such a windshield moves or eliminates the high turbulence/drag interface between the glass and the sheet metal while providing the driver with an improved vertical viewing area and admitting more light into the passenger compartment.

Such a windshield by itself is not adequate as a shading means must be provided. Flat sliding panel and rollup type sun shades are not desirable as little space is available. While sun visors can be mounted to the glass or the A pillars, they do not shade the overhead portions. Therefore, an electrically switchable material is laminated between the glass layers to form a blind and provide the sun shade function. The same material can also be used to provide the sun visors.

To overcome consumer preference for a familiar aesthetic, rather than modulating the light transmittance of the entire sheet of switchable material, the material is segmented into electrically separate circuits or "slates" to form a structure emulating a window blind. The same can be done with the visors as well, emulating the familiar rectangular shape. A controlling means allows the blind to be opened or closed in any desired sequence. Said controlling means can be equipped with a programmable user interface, which can be a smart phone or tablet, allowing the user to modify and add sequences. Said controlling means also can operate a sound emitting means which can be programmed to produce any type of sound, as may be desired, synchronized with the operation of the blind. The sound of a plastic blind opening can be used to supplement the aesthetic of a conventional window blind. Or, the user may opt for: musical notes, a slamming dungeon door, a phasor gun or just about anything imaginable, the novelty of which will appeal to a large segment of the buying public.

Said controlling means can incorporate touch sensitive switches integrated with the glass. A flexible information display can also be integrated with the glass.

The switchable material does not in any way encroach upon the vehicle headroom, is lighter than alternate implementations, has fewer parts, lower weight, lower labor, requires less vehicle assembly time and can be installed using the same tools, methods and systems already used to install windshields of the prior art.

In cold climates, high transmittance glass can be used, in conjunction with the blind, allowing the vehicle to take full advantage of the free solar energy while not overheating the vehicle on hot days.

As can be appreciated, other technology known to those practiced in the art, can be incorporated into the laminate including but not limited to: wire, silver frit, transparent conductive film or other forms of resistive heating, infrared reflecting coatings and film, photo-chromic coatings and films, tinted compositions and interlayers and heat absorbing, security and stiffening interlayers and compositions.

DETAILED DESCRIPTION OF THE INVENTION

Advantages

Extended vertical panoramic viewing angle of at least 45 degrees.

High tech aesthetic while maintaining the look and feel of a mechanical blind.

Increased natural light.

Increased vision area.

A more open and spacious feel to the vehicle cabin.

A high level of product differentiation.

Lower aerodynamic drag.

Lower weight.

Higher light transmittance when desired.

Precise control of lighting.

No loss of head room.

Compatible with existing assembly installation equipment.

Reduction in the number of parts required.

Reduction in vehicle assembly labor.

Reduction in vehicle assembly time.

The invention is best described by making reference to specific embodiments as described below:

First Embodiment

Figure 1:
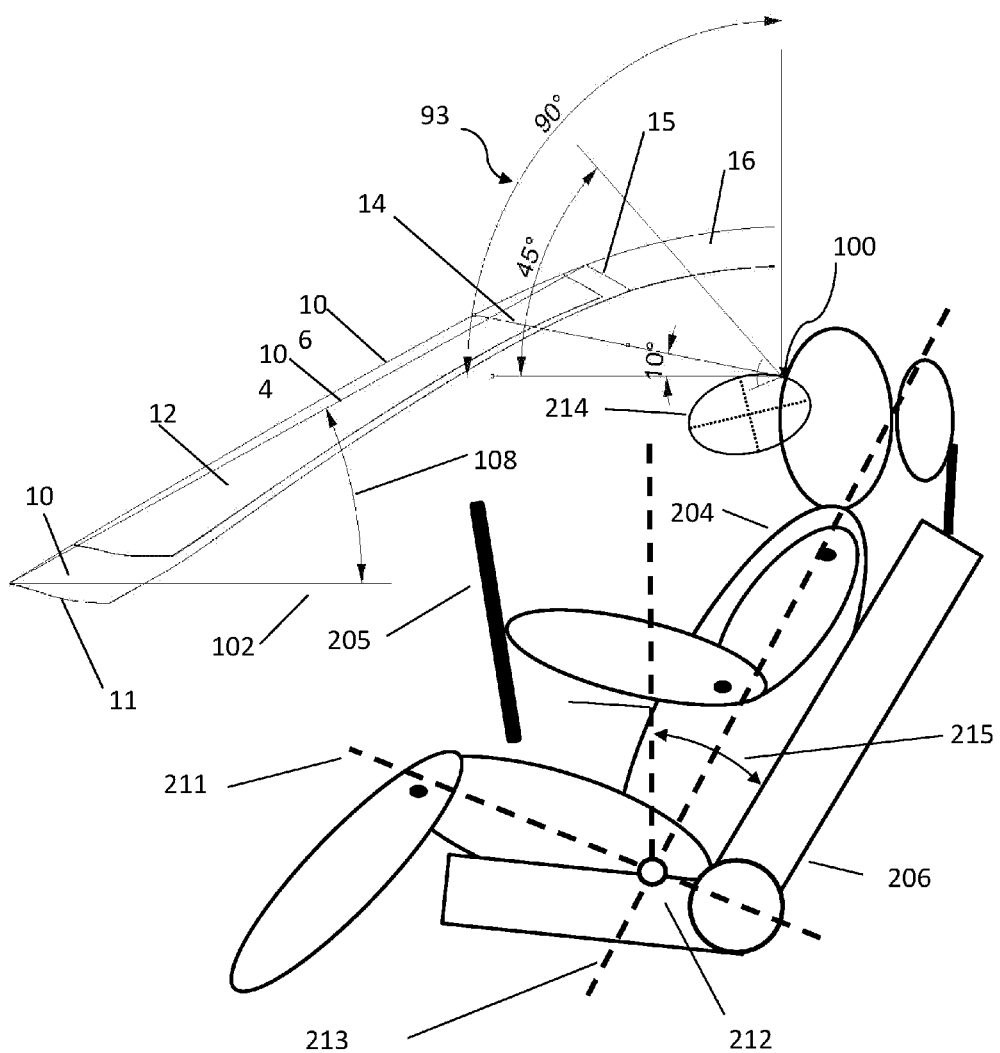
FIG. 1 shows the driver forward vision zone upper limit.
Figure 2:
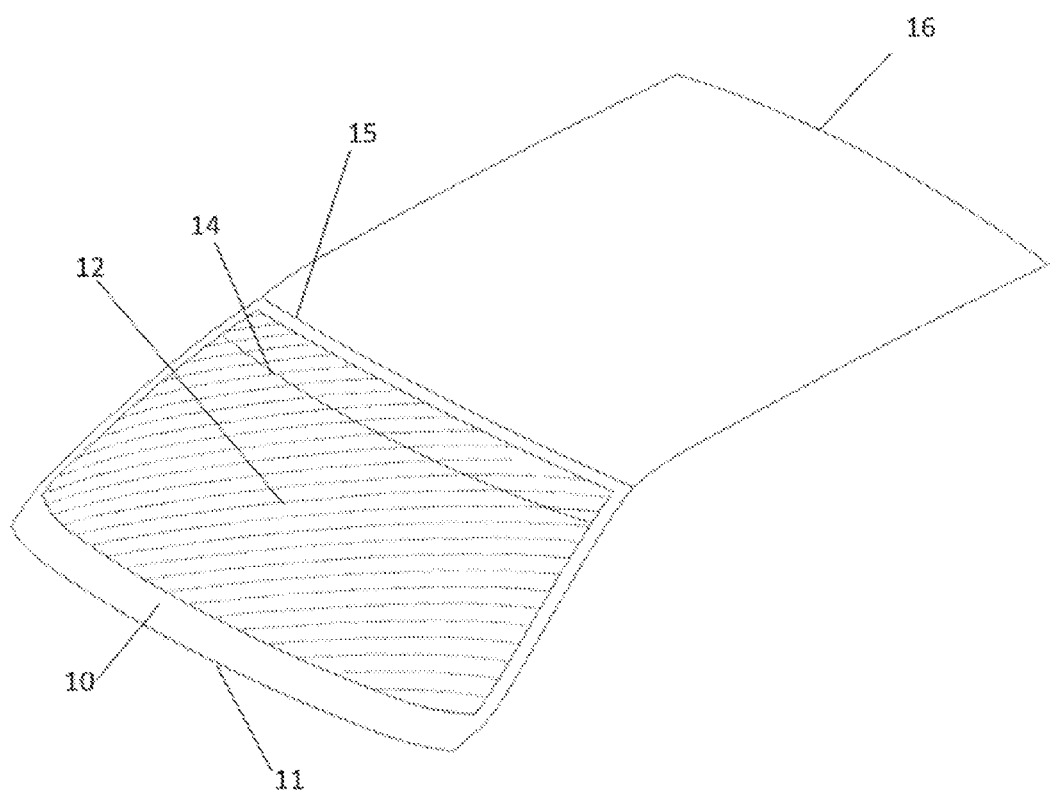
FIG. 2 shows a sheet metal roof and windshield of the prior art.
Figure 3:
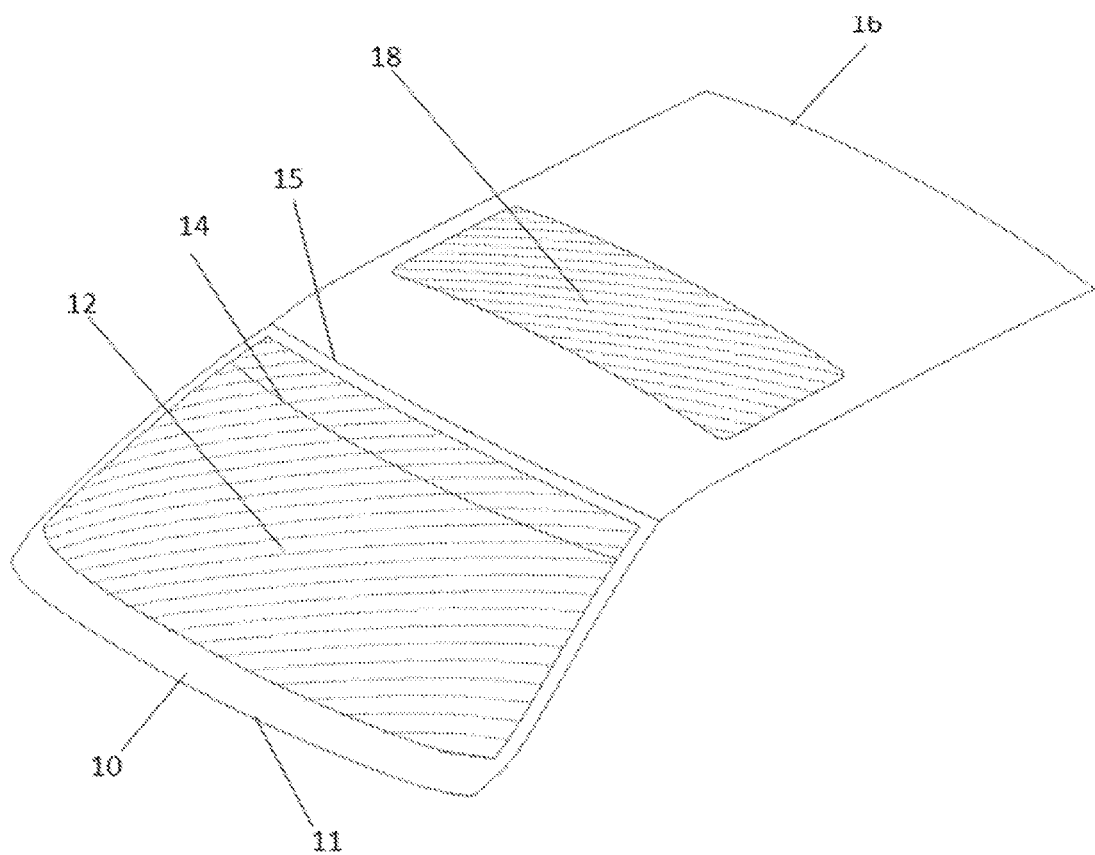
FIG. 3 show a sheet metal roof with sunroof and windshield of the prior art.
Figure 4:
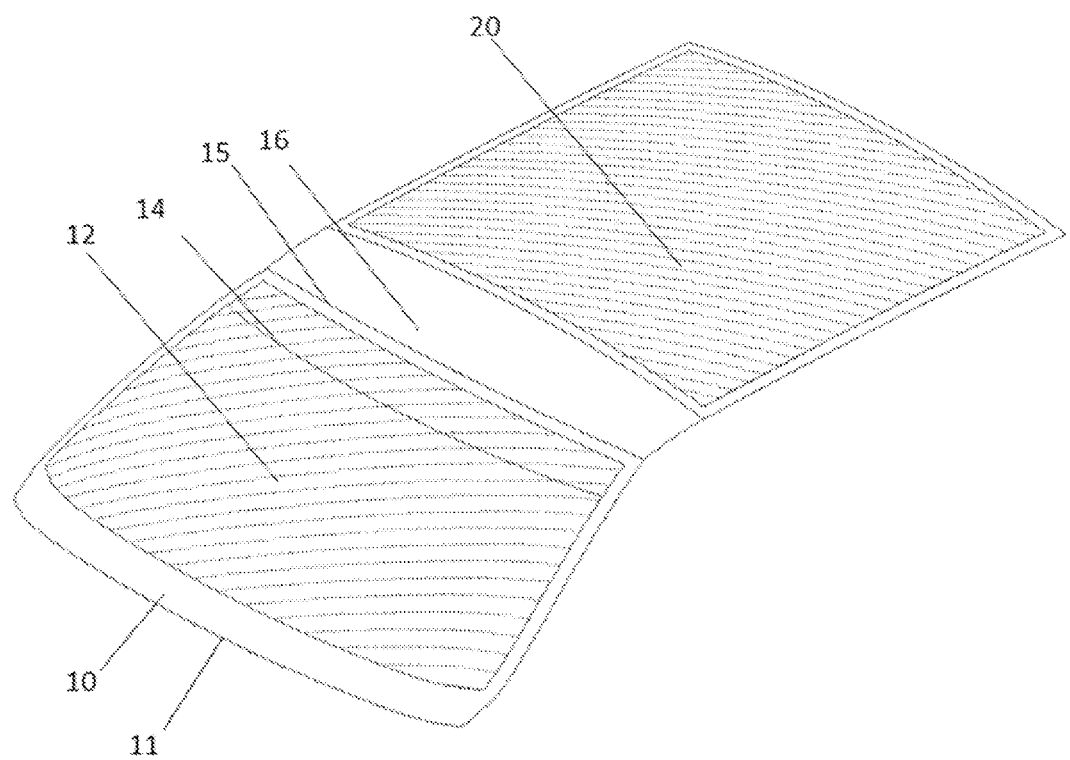
FIG. 4 shows a panoramic glass roof and windshield of the prior art.
Figure 5:
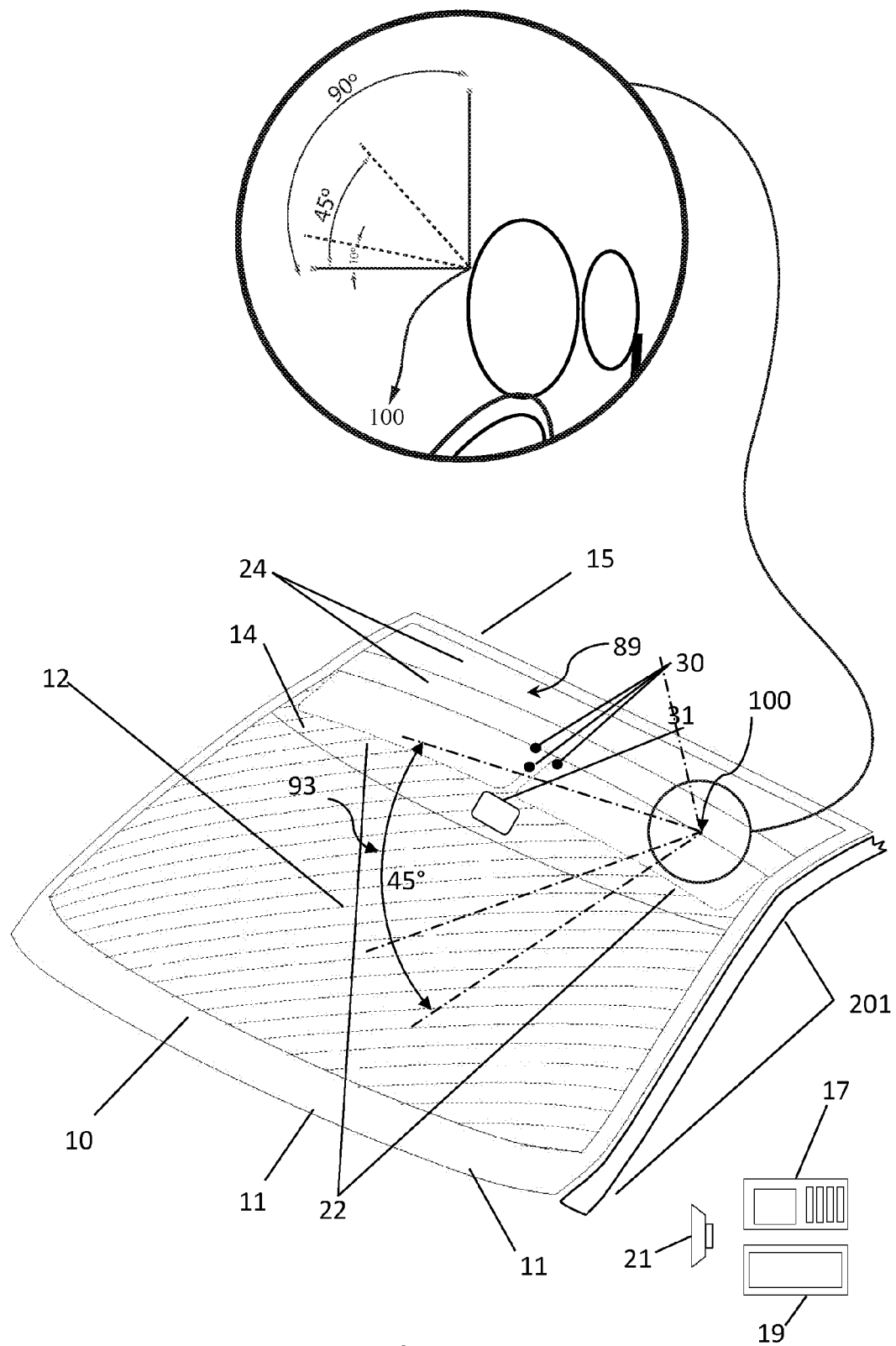
FIG. 5 shows an extended windshield with switchable visor, two slat blind and mounting studs for center console.

The present invention discloses a vehicle glazing comprising a windshield 12 having the top edge extended such as to provide the driver with an extended vertical viewing angle 93 of at least 45 degrees from the driver eye point as defined by SAE J903 and having an integrated electrically switchable blind system 89. The first embodiment is shown in FIG. 5 and is based upon the windshield 12 of FIG. 1. The bottom front edge 11 has a length of 1550 mm and the top edge 15 has a length of 1250 mm. The vertical centerline 106 length is ~900 mm and the installation angle 108 is 23 degrees. FIG. 5 shows a mounting means in the form of three studs 30 for attachment to the glass of a center console, mirrors, cameras and other devices as may be required.

The radius of the transition between the top edge 15 of the windshield 12 and the portion of the roof 16 that is substantially horizontal is 2000 mm. This large radius provides the occupants a view having little if any noticeable optical distortion. A black paint band is applied around the edge of glass on the surface of glass to hide the edge of the mounting flange of the vehicle, the adhesive used to mount the glazing, PDLC film and the electrical connectors.

The top edge 15 of the windshield 12 is extended to include the transitional portion of the roof. A heat absorbing glass composition is used for the outer layer while a clear is used for the inner. The total light transmittance of the glazing, in the AS1 area, is greater than 75%.

The PDLC film is used to provide for a two slate blind 24 and dual rectangular sun visors 22. The black band 10 is 100 mm at the bottom of the windshield 12 and 35 mm elsewhere. The black band serves to hide the edge of the PDLC film and the electrical connections to the PDLC. The PDLC has a light transmittance of 60% in the on state and is opaque in the off state.

Figure 13:
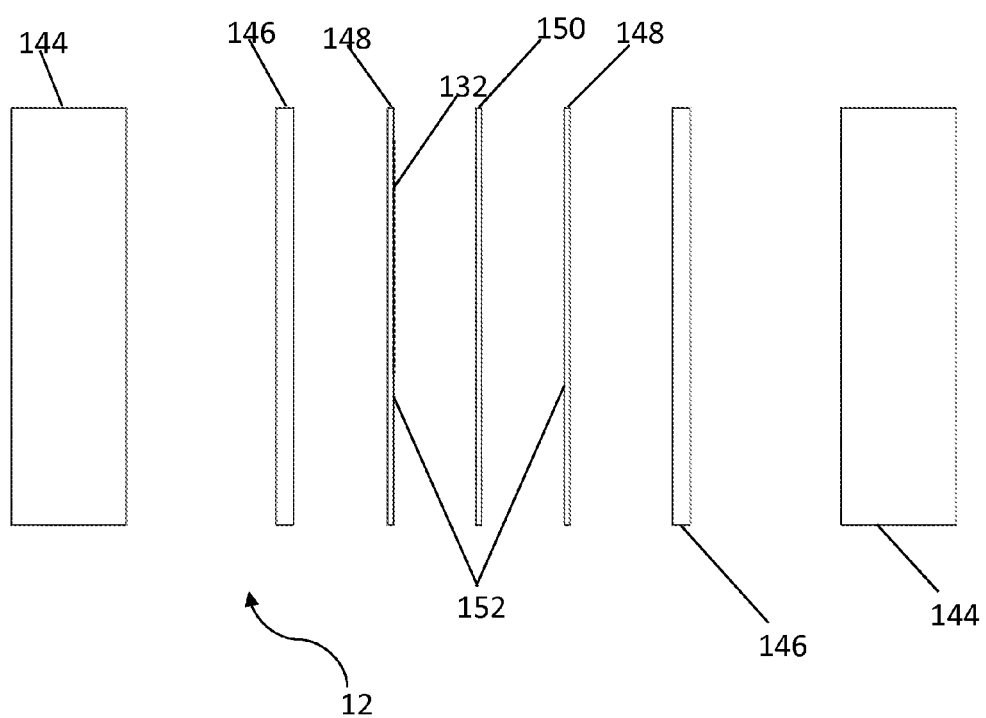
FIG. 13 shows an exploded view: cross section of laminate in blind portion.

FIG. 13 shows and exploded view of the cross section of the laminate in the blind area. The switchable active material 150 is sandwiched between two sheet of plastic 148 (PET) having a conductive transparent coating 152 (ITO) on the side of the PET 148 facing the active material 150. A $CO_2$ LASER, or other appropriate type of LASER, is used to etch conductive circuits 132 in the coating 152.

The assembled set of components comprising two transparent conductive coated 152 sheets 148 and an active variable light transmittance material 150 shall be referred to as the "film" 130. The film 130 is laminated between two sheets of glass 144 using a plastic interlayer 146 (PVB, EVA, PU 38 µm to 76 µm typical). If higher structural strength is desired, an additional sheet of interlayer 146 can be added so as to include a transparent stiffening layer in the laminate. Additional glass/plastic layers can also be added if a ballistic rating is required of the laminate.

Additional film/plastic layers such as infrared reflecting film, can be added to the entire or a portion of the glazing. Heat absorbing, acoustic dampening tinted, security and/or stiffening interlayers may also be used. Photochromic interlayer, which automatically changes tint in response to the intensity of the sunlight can be used to provide a glazing having high performance in all climates.

The glass composition used may be provided with an infrared reflecting coating, be of a tinted and/or heat absorbing composition and/or be heat or chemically toughened.

Figure 11:
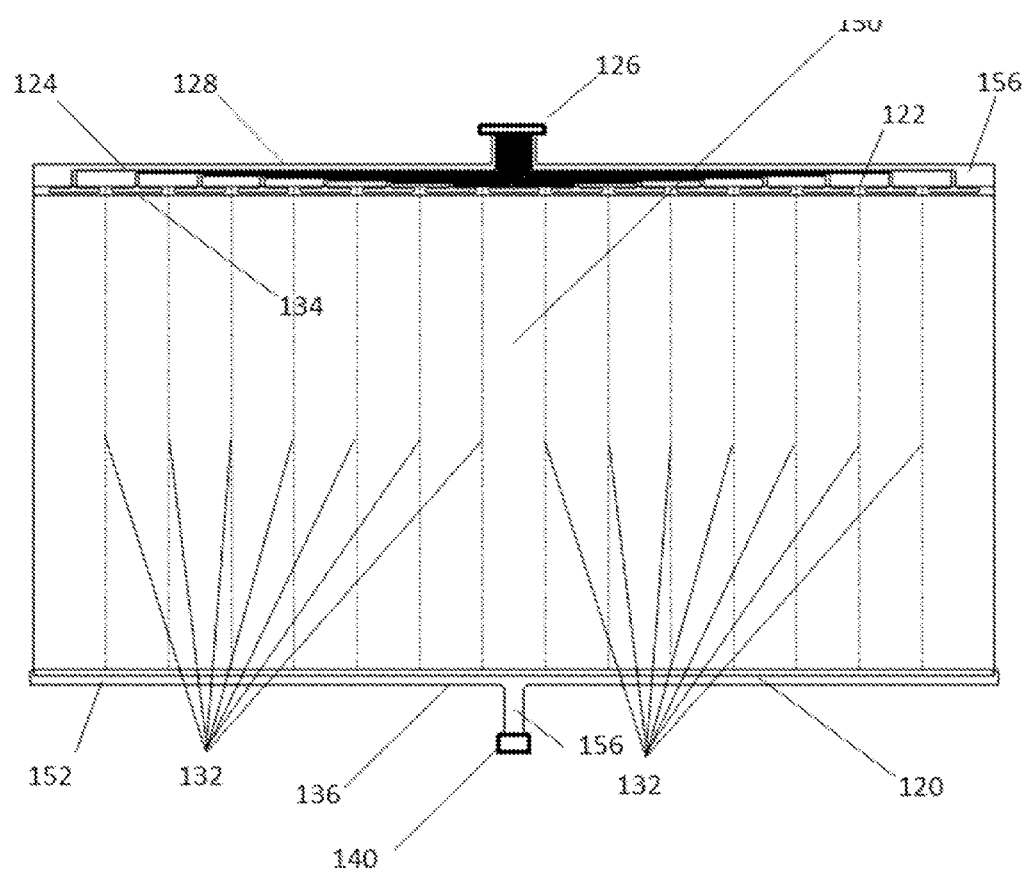
FIG. 11 shows a sheet of switchable material for shade with 15 slate visor.
Figure 12:
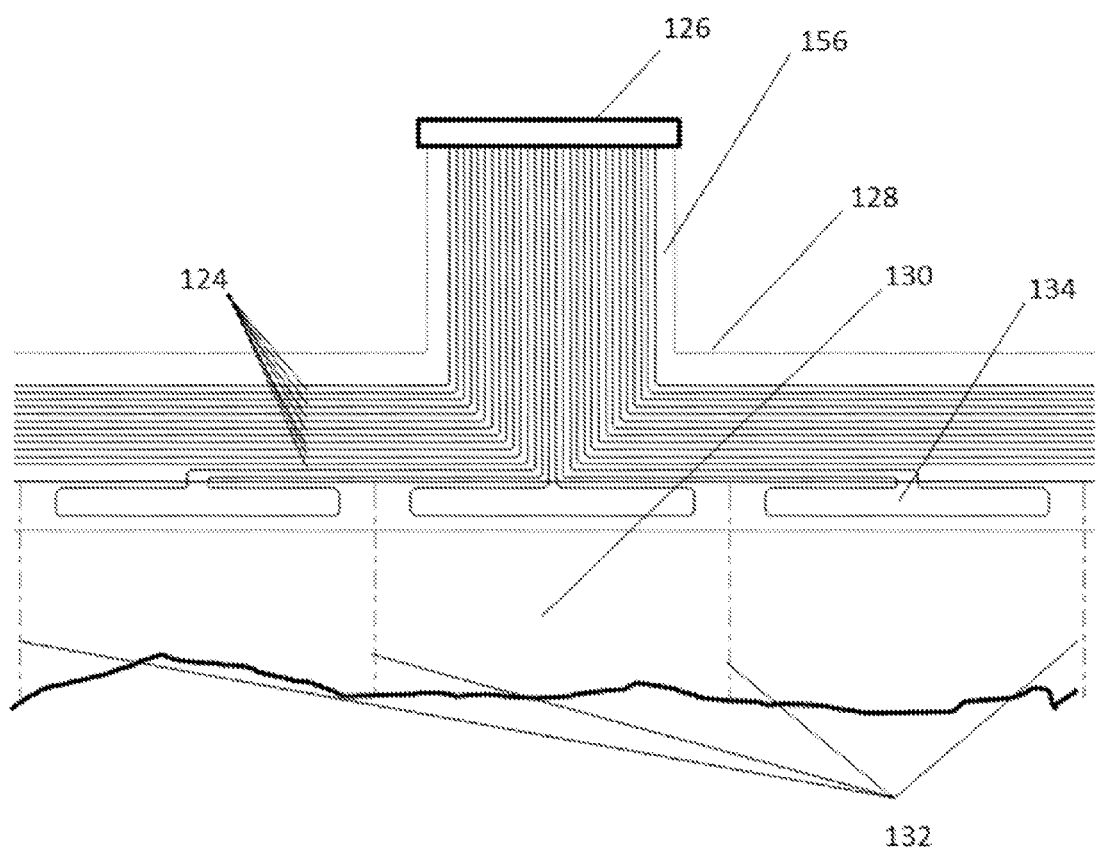
FIG. 12 shows a switchable sheet connector detail.
Figure 14:
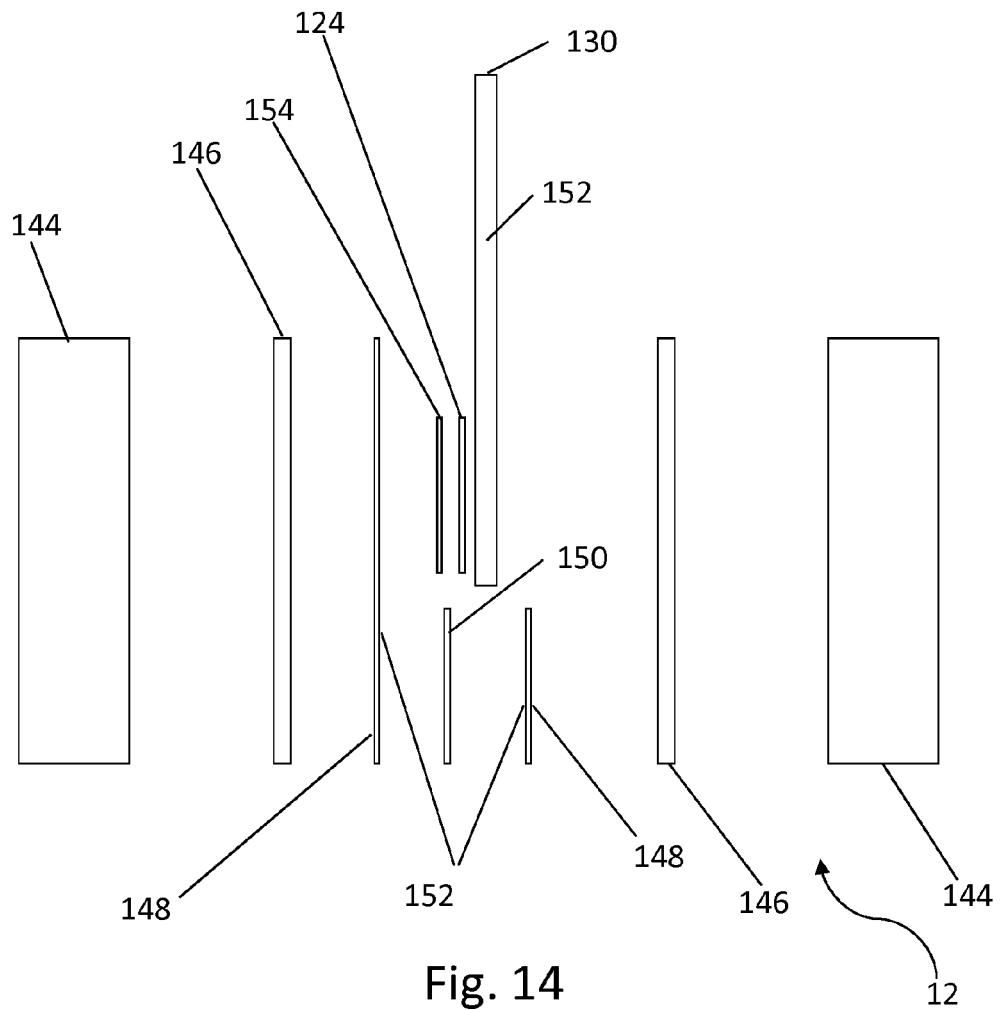
FIG. 14 shows an exploded view: cross section of laminate in blind portion with flexible connector.

FIGS. 11, 12 and 14 show various aspects of how the electrical connection to the film 130 is accomplished. At least one electrical connection must be made to each of the two conductive coated plastic sheets 148. To make electrical connections to the conductive coating 154 on each of the two conductive coated sheets 146, a portion of the opposite facing sheet must be removed, along with the active material so as to expose the conductive coating, that the connection is being made to. The portion of the opposite sheet, where the connection must be made 148, is cut away and the active material 150 is removed.

If only a single connection to a conductive coated plastic sheet 148 is required, as in the case of the neutral AC electrical connection (FIG. 11 120), thin (25-75 μm) copper sheet or tape (25-75 μm) can be used in conjunction with conductive adhesive 154 or alternately a silver paste with tape to hold the copper in place. A thin wire or connector 140 is then attached to the copper.

When multiple connections are required, as in the case of the multiple connections 128 required to switch the separate segments 24, a flexible printed circuit, of the type used in standard electronic products, is used. Copper 124 (5-50 μm thickness) is deposited on a thin durable substrate 156 to form the circuits 124 and connection pads. A conductive paste or adhesive is used to provide a durable connection to the conductive coating 152.

PDLC film, ready to laminate, is commercially available from a number of sources. In an additional embodiment of the present invention, a film 130 comprising two 125 μm thick conductive (Indium Tin Oxide, ITO) coated 152 plastic PET sheets 148, and a 50 μm layer of PDLC emulsion sandwiched in-between the two conductive surfaces, is used to produce the visor and blind slats.

The present invention discloses three different methods to produce the electrical circuits of the extended windshield 12 of the present invention. The end result is the same for each method.

The film 130 comprises two conductive coated sheets of PET 148 with the active switchable material 150 placed between the two sheets and with the conductive surface of each PET sheet 152 facing the active material 150. As one of the conductive surfaces 152 serves as the neutral of the electrical circuit only one of the sheets needs to have the conductive coating 152 cut to form the circuits 22 & 24 required to form the separately controlled portions of the film 22 & 24. The three methods differ in how the conductive coating is cut.

The first method to manufacture the film used for the windshield 12 of the present invention consists of the following steps:
1) A single sheet of PET 148 is cut to length.
2) The sheet is placed on a large flatbed pulsed CO2 LASER, with power in the range of 25-100 watts, with the conductive coated side facing towards the LASER.
3) The LASER is configured such that the PET substrate is left substantially intact.
4) The LASER follows a programmed path to produce a break in the conductive coating providing electrical isolation, between the switchable elements of the circuit 132.
5) This sheet is then used to produce the finished film 130.
This is the method used to produce embodiment 1. This method produces a separation line on the order of 50-100 μm in width, between segments, that is nearly impossible to see. The active material is also protected from the interlayer (some interlayers are not chemically compatible). The disadvantage of this method is the additional handling required. PDLC film is normally produced in a continuous process using two large rolls of conductive coated PET with the assembled film spooled onto a roll.

In the second method to manufacture the film used for the windshield 12 of the present invention,
1) A single sheet of PDLC film 130 is cut to length.
2) The film is placed on a large flatbed pulsed CO2 LASER, with power in the range of 25-100 watts. Either side of the film can be face up.
3) The LASER is configured such that the top PET sheet and conductive coating is cut through while leaving the bottom layer of PET substantially intact.
4) The LASER follows a programmed path to produce a break in the top PET and conductive coating providing electrical isolation, between the switchable elements of the circuit 134.
5) This sheet is then used to produce the finished film 130.

The separation line between segments is more noticeable with this method.

In the third method to manufacture the film used for the windshield 12 of the present invention,
1) A single sheet of PDLC film is cut to length.
2) The film is placed on a large flatbed pulsed CO2 LASER, with power in the range of 25-100 watts. Either side of the film can be face up.
3) The LASER is configured such that the film is cut completely through its thickness.
4) The LASER follows a programmed path cutting through both layers of PET and conductive coating providing electrical isolation, between the switchable elements of the circuit 134.
5) This sheet is then used to produce the finished film 130.

This results in the most visible separation line of the three methods.

The three methods can also be performed using a cutting means other than a LASER. It has been found that cutting through either a single or both layers of the PET with a blade results in a very visible separation line. A blade can be used if a visible line is the desired aesthetic.

Embodiments of the prior art, which only lighten and darken the entire switchable area, only require two connections to the film 130, one to each conductive layer 152. This is simple to accomplish with a single length of thin copper strip with a small diameter wire applied to each sheet 148. Often times the thin copper strip, used as a bus bar, 130 is used to bring the electrical connection out from the edge of the laminate. The present invention, however, required multiple connections. The 18 slat blind embodiments, shown in several of the figures, need to have at least 18 connection points, one for each slate comprising the shade, on one layer.

The electrical connections to the circuits 24 formed in the transparent conductive coating are accomplished through the use of flexible printed circuits as shown in FIGS. 11 and 12. Copper traces 124 are deposited on a thin flexible durable substrate 156 (50 μm polyamide) to form the two connector circuits needed 126 and 140. As the slate 24 and visor 22/32 elements require very little current, the traces 124 are very thin and close together less than 1 mm, which allows many traces to be side by side without having a black band 10 that is larger than otherwise required. The copper traces 124 are brought out at a single point to a connector 126, which is then used to connect the circuit to the controlling means 17. Each trace on the hot side terminates in a pad 134 (59 mm×6 mm) and a conductive adhesive 154 is applied to adhere and make an electrical connection to the ITO 152. To access and connect to the ITO 152, a strip (10 mm) is cut away from the opposite PET layer and the emulsion is removed exposing the ITO. The adhesive 124 is needed to provide for a good permanent connection between the ITO 152 and the copper 124. An alternate method in common use it to bond the copper to the ITO 152 with a Silver paste, used for circuit boards.

Figure 16:
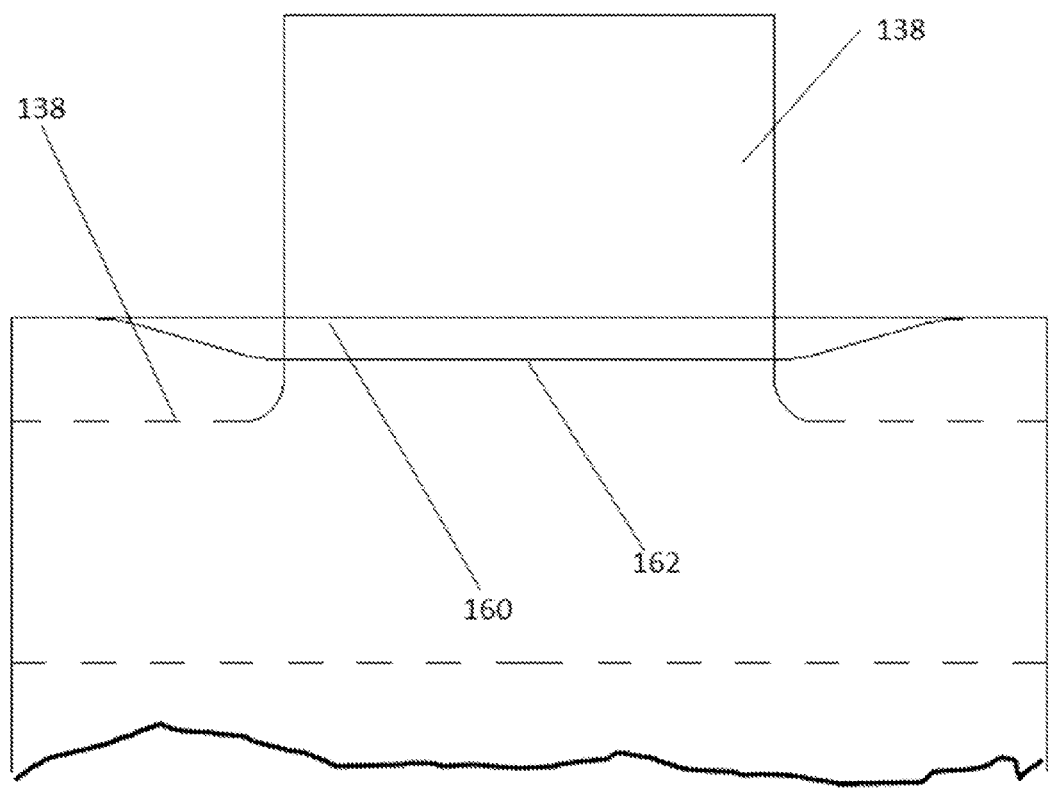
FIG. 16 shows the notch used in the inner ply of glass to protect and hide the connector.

FIG. 11 shows the flexible circuit connectors 128 & 136 that are used on the opposite sides of the PLDC film to provide for the neutral 140 and hot connections 126. The inner sheet of glass 162, shown in FIG. 16, is notched 162 (3-6 mm×50-150 mm) to protect the connector 138 and allow for the flexible connector 138 to be folded over and not be visible from the outside of the vehicle. The neutral side only needs a single wire to complete the connection.

The controlling means 17 used is a small programmable logic controller with 24 solid state outputs used to operate the 2 slate, two visor, extended panoramic windshield 12. The controller 17 can be located at any convenient location. As one practiced in the art can understand, virtually any sequence of operation can be easily programmed and a wide number of means are available for selecting and activating said sequence of operation.

To emulate a traditional blind, the slates 24 are switched, one at a time, from end to end, and with a user detectable time delay between slates (<5 s though longer delays can be used) with the objective being to mimic the aesthetic of a conventional vertical blind being opened. To further enhance the aesthetic, a sound emitting means 21 is used to emit a sound synchronized with the blind operation.

Said sound can be a musical note, the sound of plastic shuffling as one would hear operating a plastic blind, or a special effect of some kind.

The user interface 19 to the controlling means 17 can allow the user to program any desired sequence and switching time delay plus to select how each slate is switch. Slates have at least two states, opaque and transparent but can have many more. As an example, by controlling the magnitude of the peak to peak AC voltage, the light transmittance can be set to opaque, 25%, 50%, 75% and 100% of the maximum level. This can be accomplished using an electronic converter that converts DC to AC or with a rheostat. The same method of control can be used for both PDLC and SPD. Each state in the blind can go from on to off in one step or in any number of the available steps. The interface 19 also can allow the user to personalize their vehicle with one or more of their own sounds just as one would personalize their phone with a ring tone.

The user interface 19 to the control 17 can be implemented as a separate dedicated interface or integrated into one of the existing vehicle interfaces. A wireless interface can also be made to an application running on a smart phone or tablet.

Capacitive and resistive touch sensitive switches, with no moving parts, have been well known and in wide use for many years. This type of switch 31 can be integrated into the glazing through the use of conductive coatings, embedded wires, silver frit and other means. Any number of operating moods can be envisioned. In a very basic implementation, a single touch sensitive switch is provided. In even this case, various options are possible. A short tap can be programmed to open or close the shade one slate at a time whereas touching the switch for a longer period could fully open or close. More switching elements can be provided to allow for more options and even separate control of each individual slate.

The panoramic windshield 12 can also be equipped with an information display means 31. Organic Light Emitting Diode displays are being produced which are very thin and flexible, making it possible to integrate such a display with the glazing. Such a display can be located just about the AS1 area and used to display weather, traffic information, GPS data, safety alerts and other data.

Figure 17:
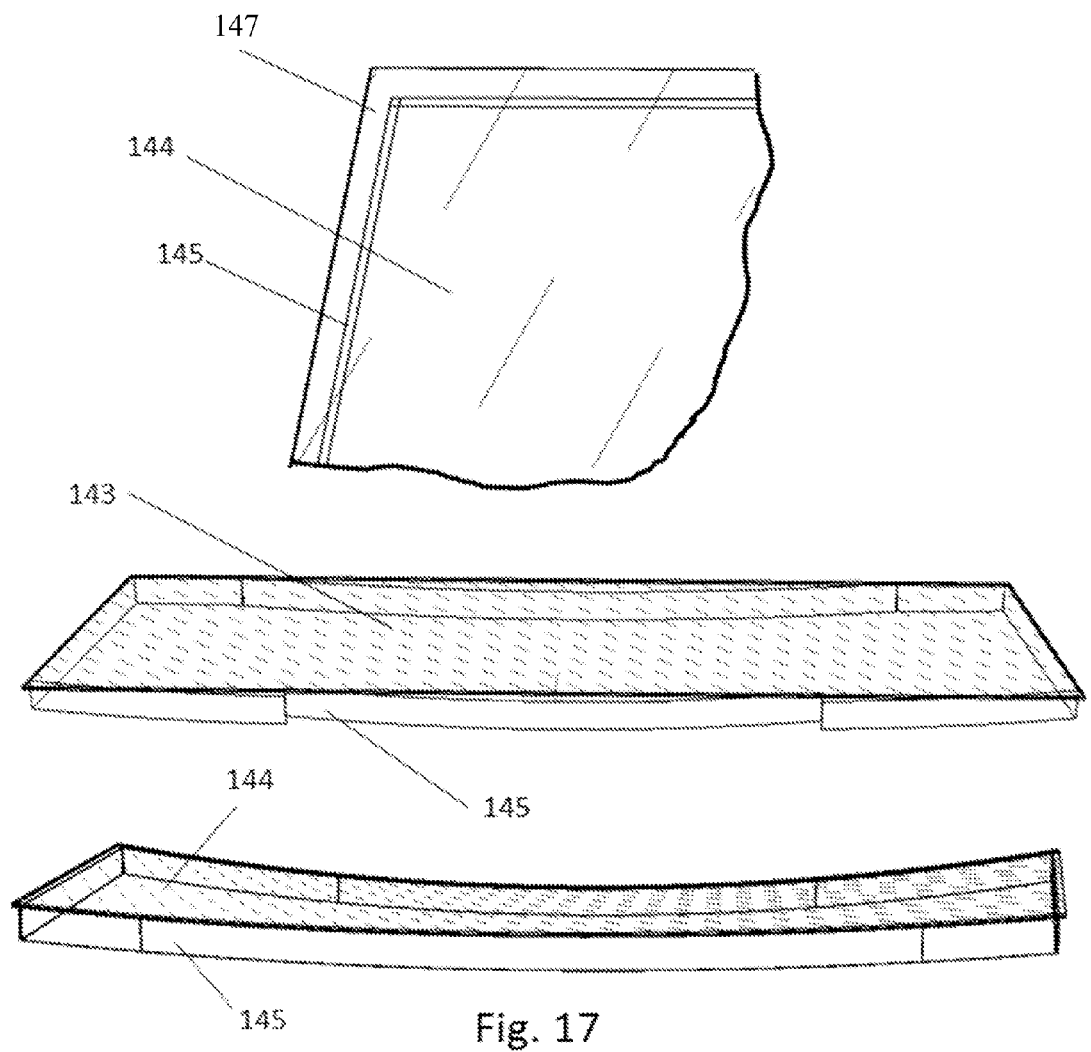
FIG. 17 shows a typical bending iron mold
Figure 18:
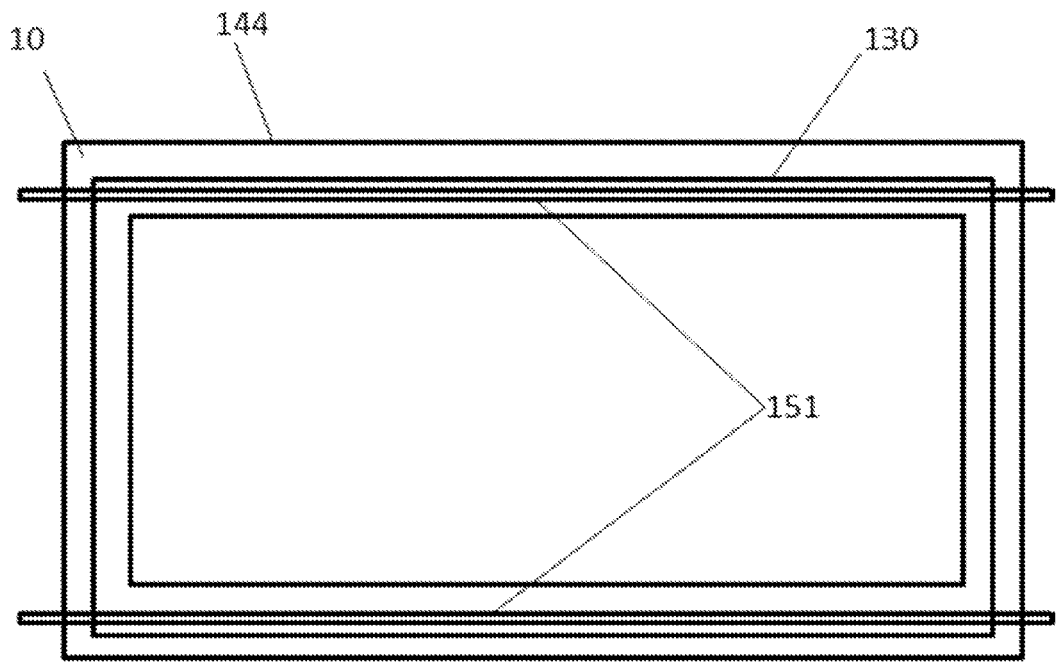
FIG. 18 shows a switchable film of the prior art.

Doublet gravity bending of windshields is used in some embodiments of the present invention to bend the glass. This process is well known to those skilled in the art of windshield manufacturing and is substantially the same process used to produce large commercial vehicle windshields. Doublet gravity bending is the typical method used to manufacture the majority of vehicle windshields worldwide. Two or more sheets of glass 144, cut to shape, are bent using a tool known as a bending iron or bending mould (FIG. 17).

The bending iron is designed to support the flat unbent glass at multiple level contact points. To do so, the bending iron is manufactured with a rail 145 which is formed perpendicular to the final bent glass surface 144 and shaped to provide support to the bent glass up to 12 mm inboard 147 from the edge of the glass.

The rail 145 is typically constructed from 6.35 mm×25-100 mm 304 stainless steel flat stock or sheet. In order to support the flat glass 143 in a level position, the rail must be cut into segments and hinged to open and close as shown in FIG. 17 which shows a bending iron in the full open and full close positions as well as the glass overhanging the rail. The flat glass 143 is loaded onto the open bending iron and then heated. As the glass 144 softens and sags, the hinged portions of the bending iron move towards the closed position. This process is suitable for producing the Panoramic Extended Windshield described herein.

The PDLC film is processed as previously described and shown in FIG. 11. Opposite edges, top 122 and bottom 120 as shown in the figure, of each PET layer are cut back by 12 mm in one of the preferred embodiments of the present invention and the active emulsion is removed exposing the conductive coating. The flexible hot and neutral busbar/connector flexible substrates 136, 128 are then adhered to the ITO. Connectors 126, 140 are installed after lamination.

One of the problems when laminating any type of film occurs when the film does not cover the entire area of the glass which is the case in one of the embodiments of the present invention. The uneven thickness results in a bending moment in the glass and high surface tension which can cause breakage. To prevent this problem, the flexible connectors are designed such that they are the same thickness as the material that they replace (one layer of PET and the active switchable layer). They are also oversized so that the outboard edge of the connector comes within 3 mm of the edge of glass. It can be appreciated that some windshields using thicker or strengthened glass or a different interlayer may not need to extend that close to the edge of glass and that in fact the connector can extend beyond the edge of glass.

Figure 15:
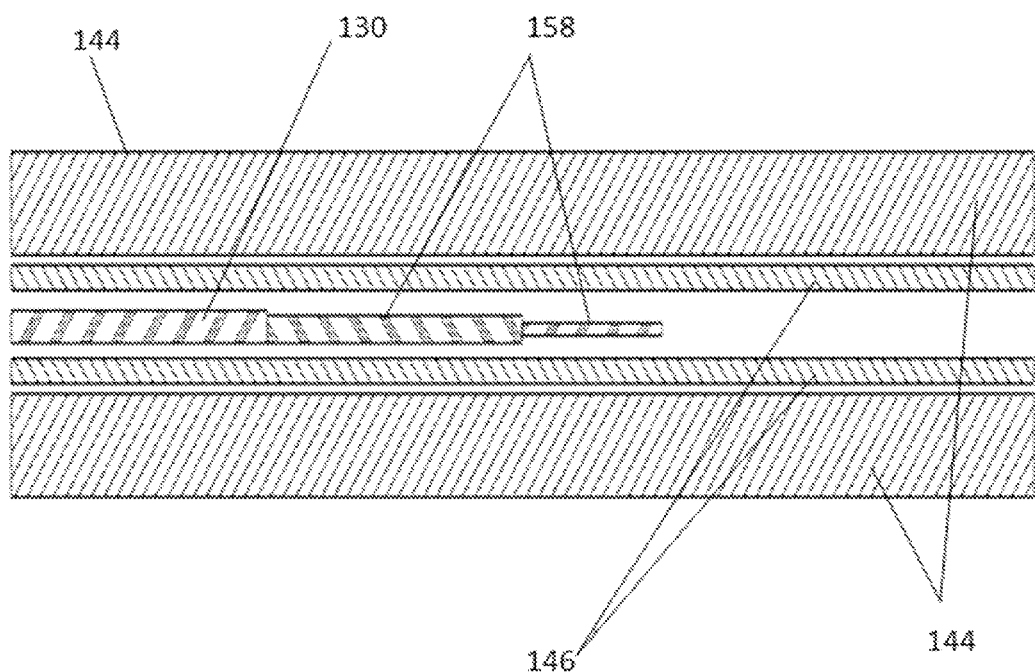
FIG. 15 shows a cross section of the laminate near an edge with two spacers used to reduce the bending moment and surface tension in the glass that would otherwise occur due to the abrupt change in thickness.

On the leading and trailing edge of the film 130, as shown in FIG. 15, one or more "spacer" layers 158 of PET are added so as to allow for a more gentle transition in thickness spread over a greater distance. As an example, if the total film thickness is 500 μm, a 50 mm wide strip of 250 u PET would be inserted in the laminate followed by a 25 mm wide 125 μm spacer strip. As can be appreciated, any other transparent material that can hold up during the fabrication process and in use could be used. If the edge of the film is in the area hidden by the black paint, the material need not be transparent.

The glass layers 144, interlayers 146 and processed switchable film 130 with flexible circuits 126/140 are assembled together, placed in a vacuum bag, and then processed in an autoclave. The lamination process described is the exact same as used for conventional windshields with embedded wire heating and various types of film so this process will not be described in detail as it is well known to those of ordinary skill in the art of windshield manufacturing.

On the vehicle assembly line, the panoramic windshield 12 can be installed using the same automated systems used for ordinary windshields with new end of arm tooling and some adjustment to the working envelope.

Second Embodiment

Figure 6:
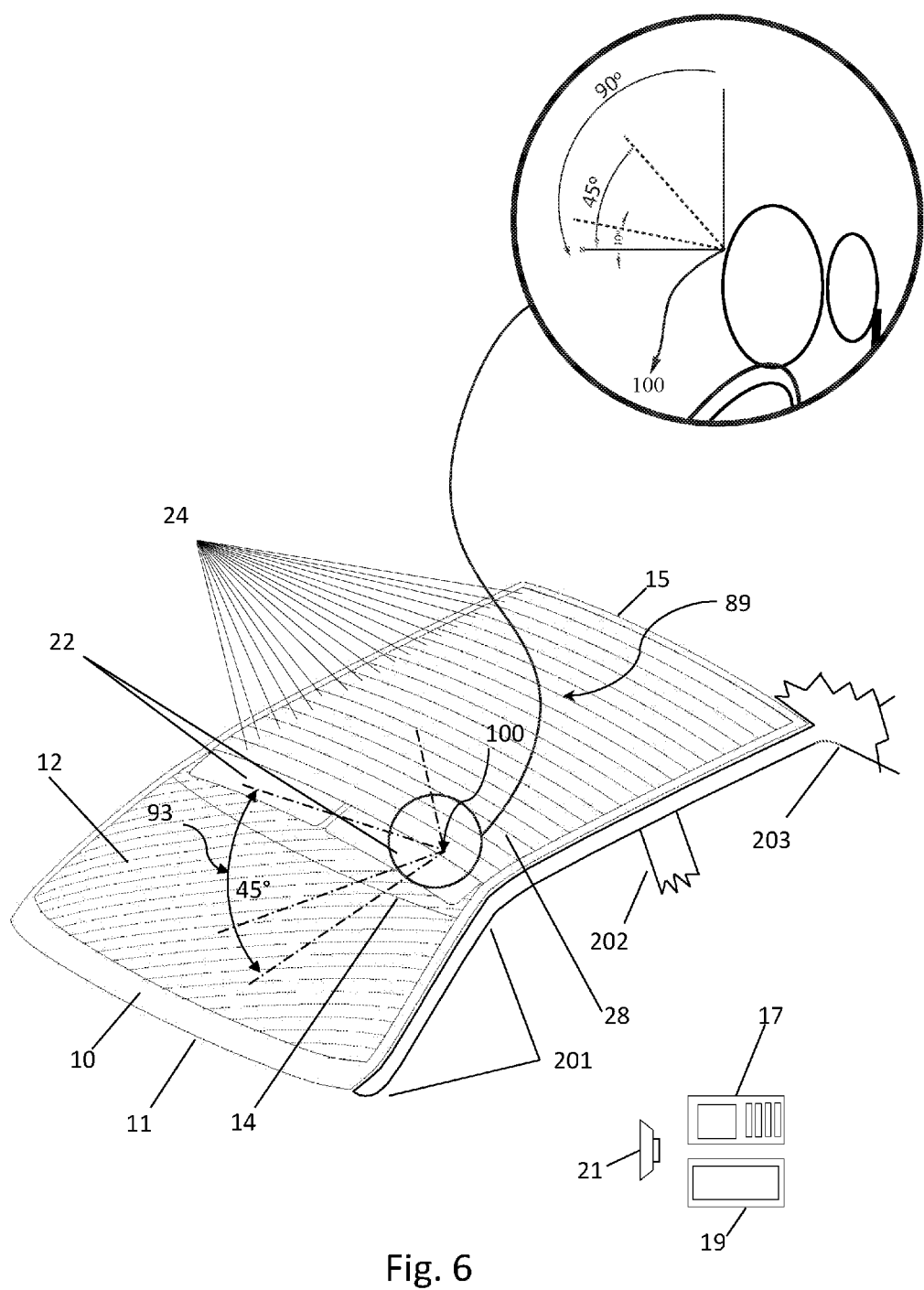
FIG. 6 shows an extended windshield incorporating entire roof, with switchable dual rectangular visors and eighteen slat blind.
Figure 19:
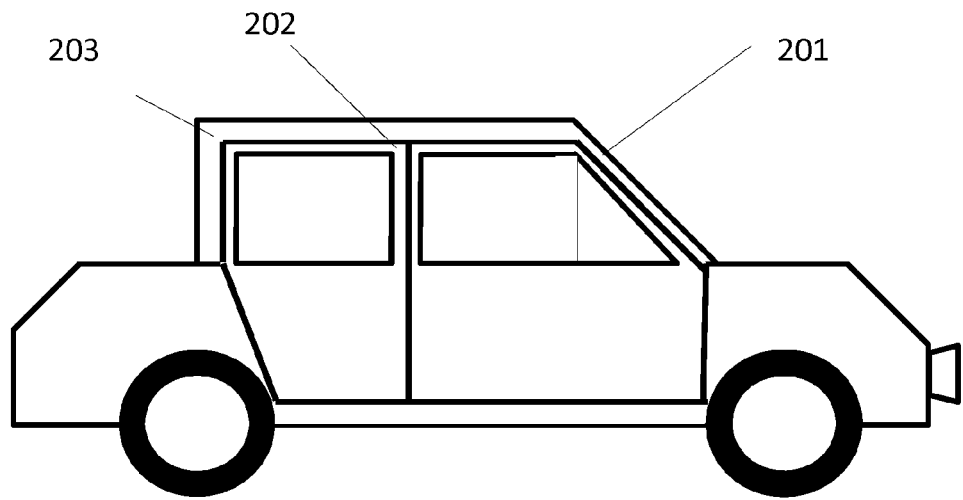
FIG. 19 shows the various pillars in an automobile, which determine the locations of some of the elements described in this application.

FIG. 6 shows a second embodiment of the present invention. The top edge 15 has been extended to include substantially the entire roof and includes a dual rectangular visor 22 and an 18 slat PDLC blind 28. The addition of the visor eliminates the need to mount a mechanical visor to the glass or A-pillar 201 (as shown on FIG. 19), adding to the advantages already presented in the first embodiment. All other details are the same as in Embodiment one.

Third Embodiment

Figure 7:
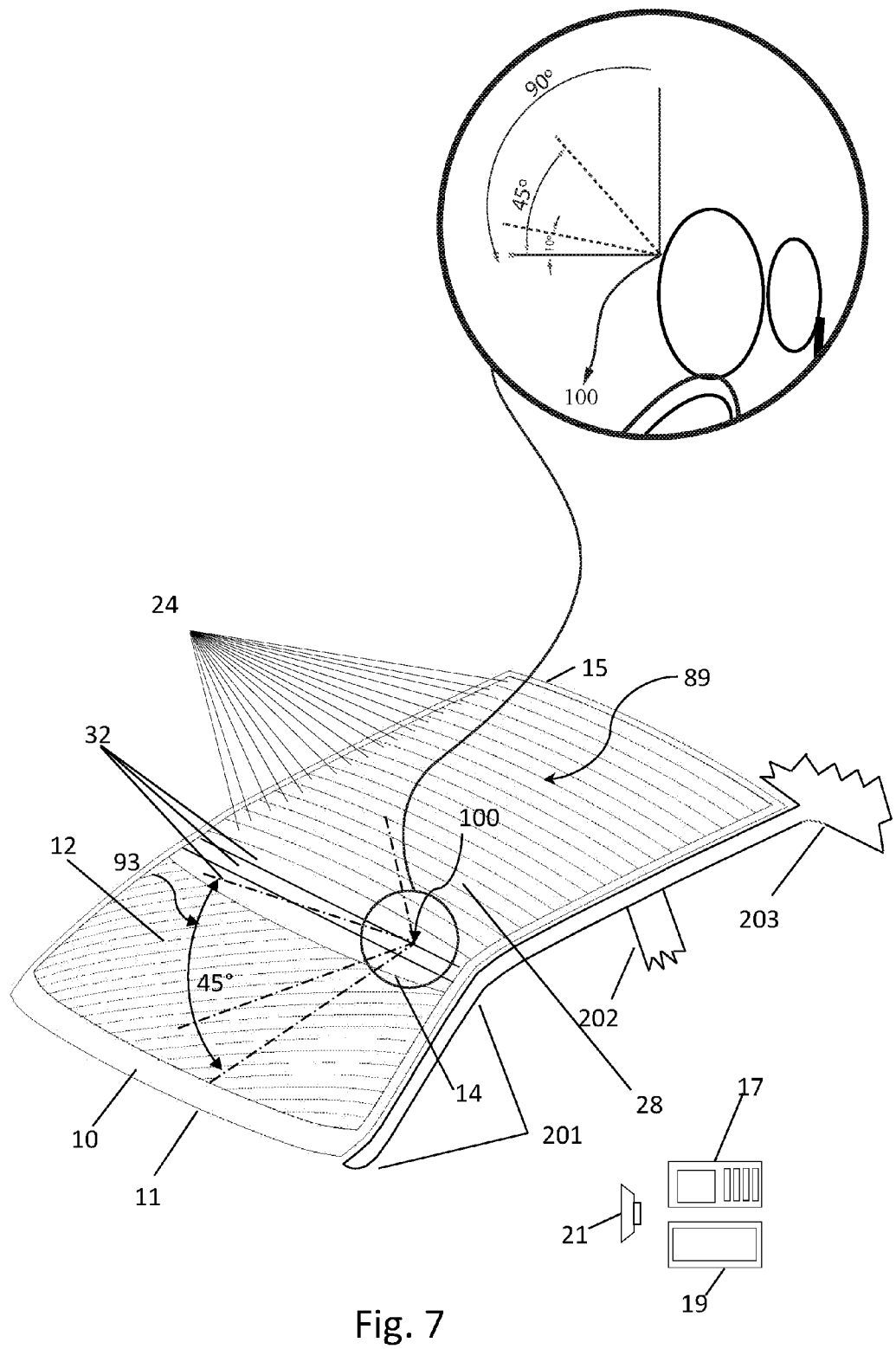
FIG. 7 shows an extended windshield incorporating entire roof, with switchable visors extending to AS1 and eighteen slat blind.
Figure 8:
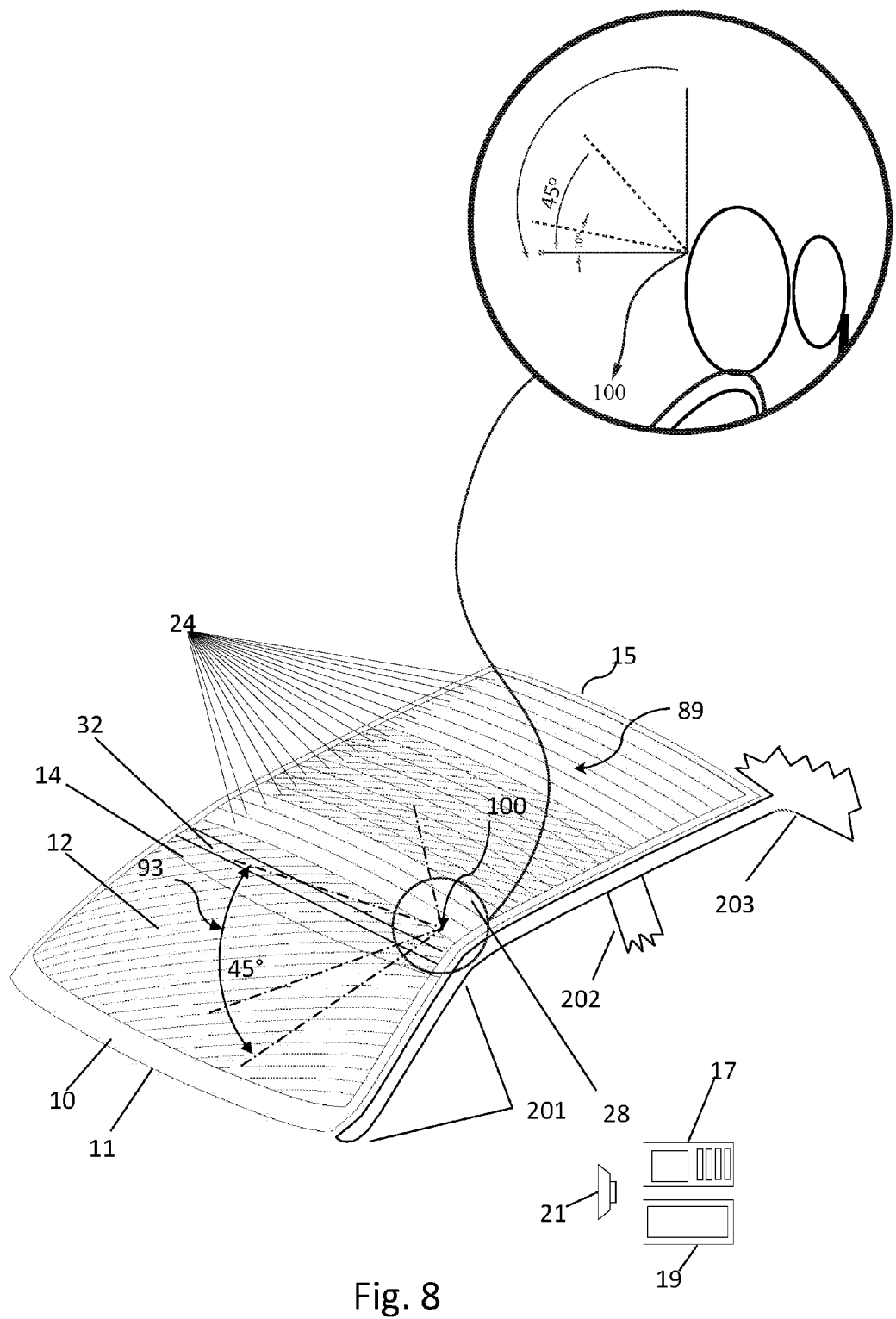
FIG. 8 shows an extended windshield incorporating entire roof, with switchable visors extending to AS1 and eighteen slate blind with slates shown with visor and slate above drive in transparent state.

FIG. 7 shows a third embodiment of the present invention. The top edge 15 has been extended to include substantially the entire roof and includes a segmented visor 32 extending to the AS1 line and an 18 slat PDLC blind 28. FIG. 8 shows the third embodiment with the slates in the area above the drive in the on state. All other details are the same as in Embodiment two.

Forth Embodiment

Figure 9:
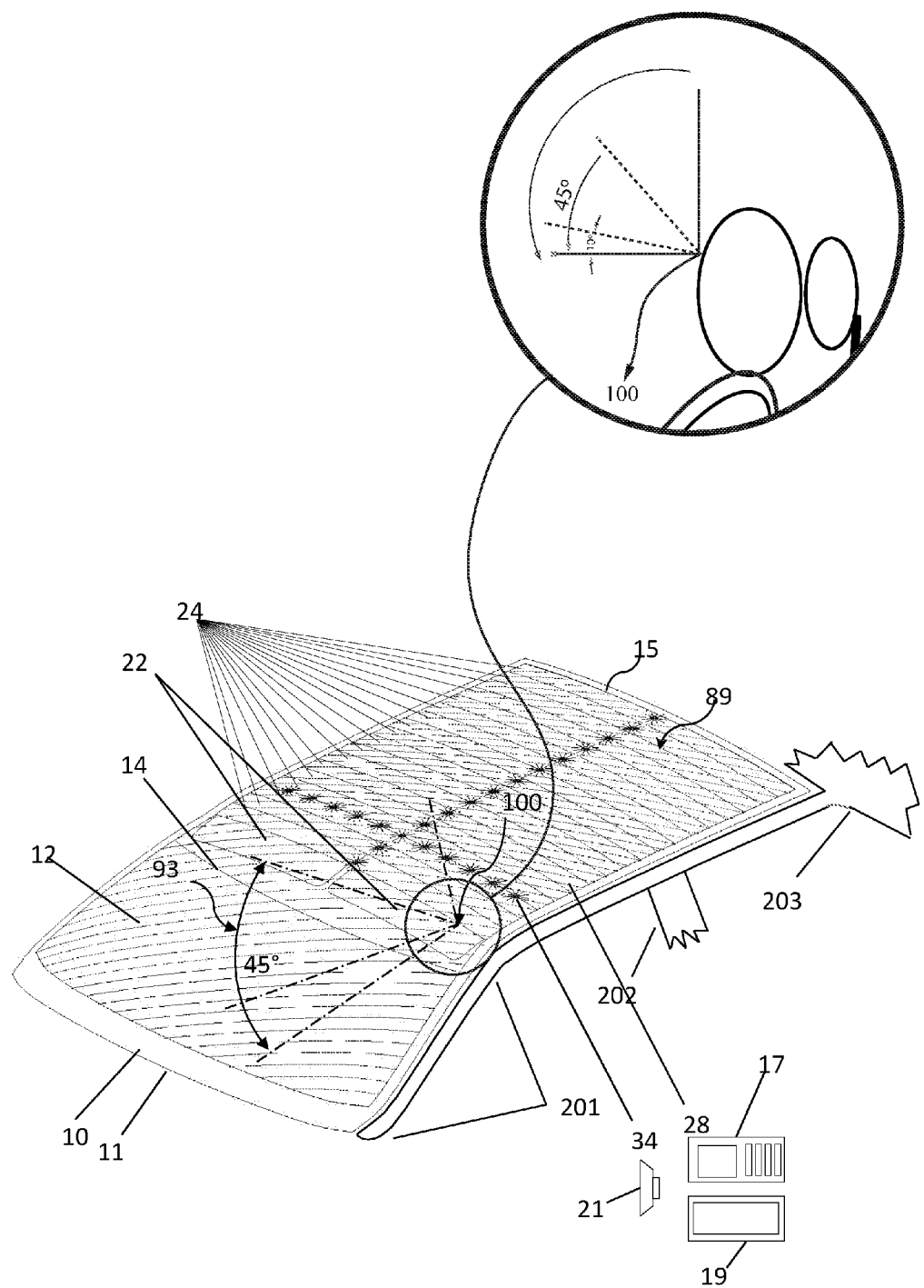
FIG. 9 shows an extended windshield incorporating entire roof, with switchable visors extending to AS1 and eighteen slate blind with LED lights along fore-aft centerline and above drive and passenger positions.

FIG. 9 shows the forth embodiment which is the second embodiment with the addition of LED lighting. The LEDs are mounted to a transparent conductive coated substrate and laminated into the glazing. One string runs along the centerline from the fore to the aft edge of the roof. A second string runs perpendicular to the centerline and provides for passenger and driver reading lamps.

Fifth Embodiment

Figure 10:
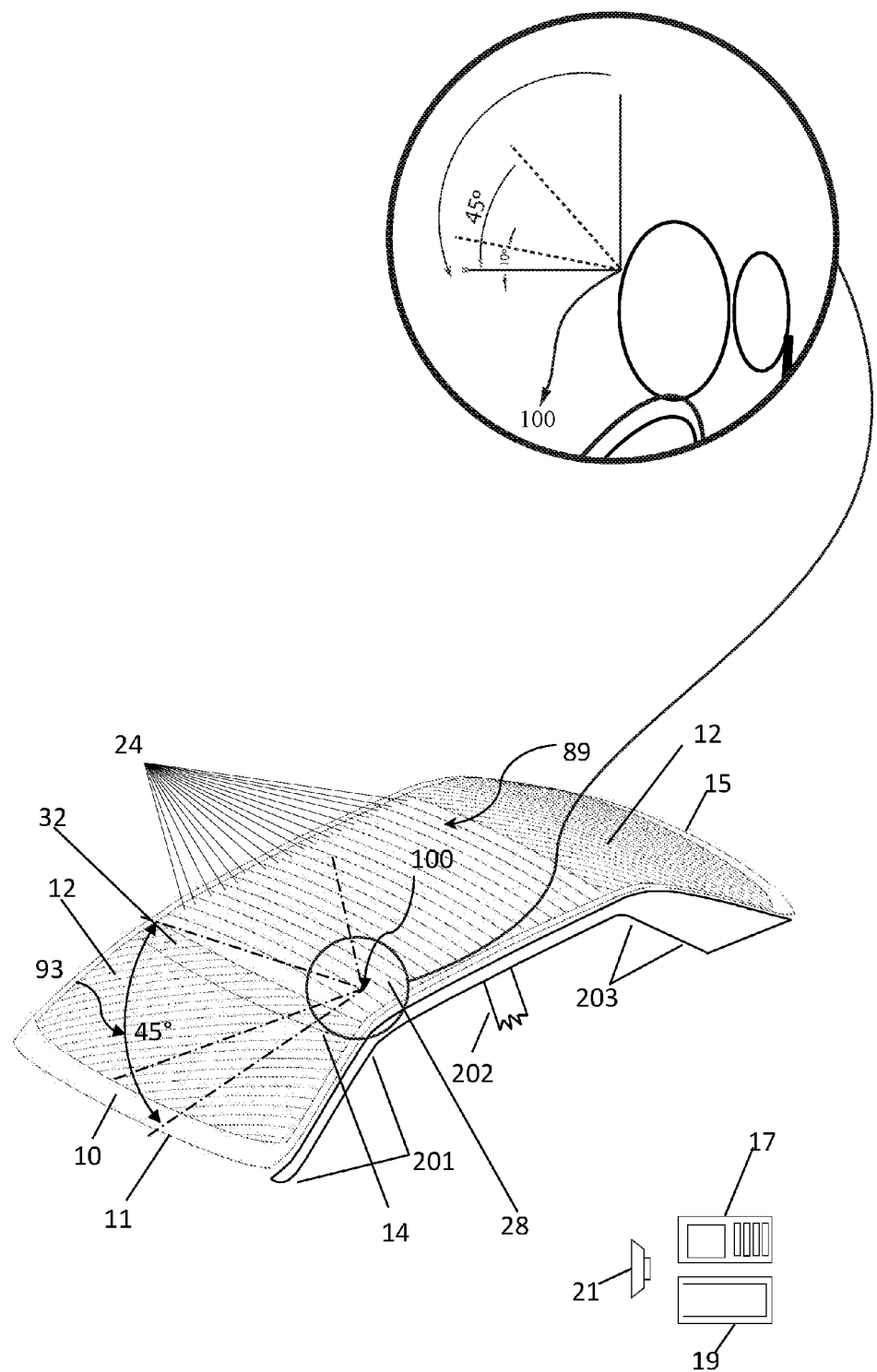
FIG. 10 show an extended windshield incorporating entire roof and rear window, with segmented switchable visor extending to AS1 and eighteen slate blind.

FIG. 10 shows a fifth embodiment of the present invention. The top edge 15 has been extended to include substantially the entire roof and rear window and includes an 18 slat PDLC blind 28. The addition of the visor eliminates the need to mount a mechanical visor to the glass or A-pillar 201, adding to the advantages already presented in the first embodiment. All other details are the same as in Embodiment one.

It must be understood that this invention is not limited to the embodiments described and illustrated above. A person skilled in the art will understand that numerous variations and modifications can be carried out that do not depart from the spirit of the invention, which is only defined by the following claims.

REFERENCES CITED

U.S. Patent Documents

| | | |
|---|---|---|
| U.S. Pat. No. 8,613,997 B2 | Dec. 24, 2013 | Stephen Roland Day |
| U.S. Pat. No. 8,678,488 B1 | Mar. 25, 2014 | Kim |
| U.S. Pat. No. 7,814,958 B2 | Oct. 19, 2010 | Hanson, Stark |
| U.S. Pat. No. 8,102,586 B2 | Jan. 24, 2012 | Albahri |
| U.S. Pat. No. 6,118,410 A | Sep. 12, 2000 | Nagey |
| U.S. Pat. No. 7,333,258 B2 | Feb. 19, 2008 | Yang |
| US 20130038093 A1 | Feb. 14, 2013 | Snider |
| US 20070182217 A1 | Aug. 9, 2007 | Saleen, Tally |
| US 20120307337 A1 | Dec. 6, 2012 | Bartrug et all |

Foreign Patent Documents

| | | |
|---|---|---|
| WO 1999018320 A1 | Apr. 15, 1999 | Elliott, Janning |
| DE102004010790 A1 | Oct. 6, 2005 | Matthias Hallik |
| EP 1710104 B1 | Nov. 4, 2009 | Matthias Hallik |
| WO2013079832 A1 | Jun. 6, 2013 | Adèle Verrat-Debailleul |
| WO 2014055386 A1 | Apr. 10, 2014 | Vijayen S. Veerasamy |

Nonpatent Documents

| | | |
|---|---|---|
| SAE J903-1999 | 1999 | SAE |

The invention claimed is:

1. A vehicle glazing comprising:
   a windshield having a top edge extended to provide a driver with
   an extended vertical viewing angle, as described in SAE standard J903 of 1999, of at least 45 degrees;
   wherein said windshield comprises two glass layers having an static electrical blind between said two glass layers and wherein said static electrical blind's light transmittance is switched electrically; and;
   wherein said electrical blind is controlled by a controlling means capable of executing predetermined switching sequences of said blind and a user interface connected to said controlling means.

2. The vehicle glazing of claim 1 where the top edge is extended to the B pillar.

3. The vehicle glazing of claim 1 where the top edge is extended to include substantially the entire roof area of the vehicle and the rear window.

4. The vehicle glazing of claim 1 in which the blind has at least two segments, which can each be switched electrically between at least two distinct states of light transmittance.

5. The vehicle glazing of claim 1 in which the blind is fabricated from polymer dispersed liquid crystals (PDLC) film.

6. The vehicle glazing of claim 1 in which the blind is fabricated from SPD film.

7. The vehicle glazing of claim 1 in which the blind comprises an electrical circuit, in a conductive coated plastic used to sandwich an active emulsion, is fabricated by cutting through substantially just the conductive coating of a transparent conductive coated plastic sheet, and not the plastic itself, prior to assembly of the two sheets of plastic and emulsion to produce a film.

8. The vehicle glazing of claim 7 in which the blind electrical circuit is fabricated by cutting through a single layer of conductive coated plastic after the film has been assembled.

9. The vehicle glazing of claim 7 in which the blind electrical circuit is fabricated by cutting through the thickness of film including both conductive coated plastic sheets after the film has been assembled.

10. The vehicle glazing of claim 7 where the cutting means is a LASER, ultrasonic cutter or blade.

11. The vehicle glazing of claim 1 wherein the blind comprises sections in the shape of sun visors in which the level of light transmission can be controlled electronically.

12. The vehicle glazing of claim 11 wherein the sections in the shape of sun visors is formed from the same sheet of switchable material as the shade.

13. The vehicle glazing of claim 11 wherein the sections in the shape of sun visors are substantially rectangular in shape and extend to the AS1 line.

14. The vehicle glazing of claim 11 in which the sections in the shape of sun visors are segmented into two or more separately controlled elements.

15. The vehicle glazing of claim 1, wherein the controlling means comprises sound emitting means synchronized with the operation of the blind.

16. The vehicle glazing of claim 1, wherein the user interface is connected through a wireless connection to said controlling means.

17. The vehicle glazing of claim 16, wherein the interface is comprised of the elements of the group comprising a smart phone, a tablet, a touch screen and a multifunction vehicle display.

18. The vehicle glazing of claim 1 in which the blind comprises flexible connectors that extend to within at least 10 mm from the edge of the windshield to facilitate lamination.

19. The vehicle glazing of claim 5, wherein the blind comprises alternating section with and without PLDC, in which the transition from the area having PDLC film and the area not having PDLC film is bridged through the use of one or more progressively thinner strips of transparent material to facilitate lamination.

20. The vehicle glazing of claim 1, further comprising light emitting means integrated into the blind.

21. The vehicle glazing of claim 20, comprising light emitting means being at least one light emitting diode (LED) or electro-luminescent device.

22. The vehicle glazing of claim 1, comprising photo-chromic film in all or a portion of the glazing area.

23. The vehicle glazing of claim 22 further comprising a photo-chromic coating in all or a portion of the glazing area.

24. The vehicle glazing of claim 1 further comprising an infra-red reflecting film or coating in all or a portion of the glazing area.

25. The vehicle glazing of claim 1 further comprising a heat absorbing film or glass in all or a portion of the windshield.

26. The vehicle glazing of claim 1 further comprising a tinted film or a tinted glass composition in all or a portion of the windshield.

27. The vehicle glazing of claim 1, wherein the user interface comprises an integrated information display.

28. The vehicle glazing of claim 1, wherein the user interface further comprises one or more integrated touch sensitive switches for the purpose of sending commands to the controlling means.

* * * * *